(12) United States Patent
Leung

(10) Patent No.: US 6,233,401 B1
(45) Date of Patent: May 15, 2001

(54) SINGLE-USE CAMERA AND METHOD OF FILM LOADING

(75) Inventor: Wai Chun Leung, Kowloon (HK)

(73) Assignee: Foster Assets Corporation, Tortola (VG)

( * ) Notice: Subject to any disclaimer, the term of this patent is extended or adjusted under 35 U.S.C. 154(b) by 0 days.

(21) Appl. No.: 09/305,692

(22) Filed: May 5, 1999

(51) Int. Cl.[7] .................................................. G03B 17/02
(52) U.S. Cl. .................................................. 396/6; 396/538
(58) Field of Search ............................ 396/6, 535, 538, 396/541; 242/348.1

(56) References Cited

U.S. PATENT DOCUMENTS 5,311,231 * 5/1994 Suzuki et al. ............................ 396/6
5,758,198   5/1998 Watkins et al. .
5,812,884   9/1998 Sangregory .
5,873,002   2/1999 Glanville, Sr. et al. .

FOREIGN PATENT DOCUMENTS

0851275 A1   7/1998 (EP) .
WO 98/11469  3/1998 (WO) .

* cited by examiner

Primary Examiner—Alan A. Mathews
(74) Attorney, Agent, or Firm—Samuels, Gauthier & Stevens

(57) ABSTRACT

A camera comprises a main body defining a chamber (8) for receiving, in use, a film-containing cassette (9), and a film-receiving chamber (10) for receiving, in use, a roll of film unwound from said cassette, the film extending between said chambers (8, 10) over an exposure window (6), wherein adjacent said film-receiving chamber (10) there is defined an aperture for insertion of a film winding tool (110) said aperture being closed by a movably mounted cover part (38).

27 Claims, 14 Drawing Sheets

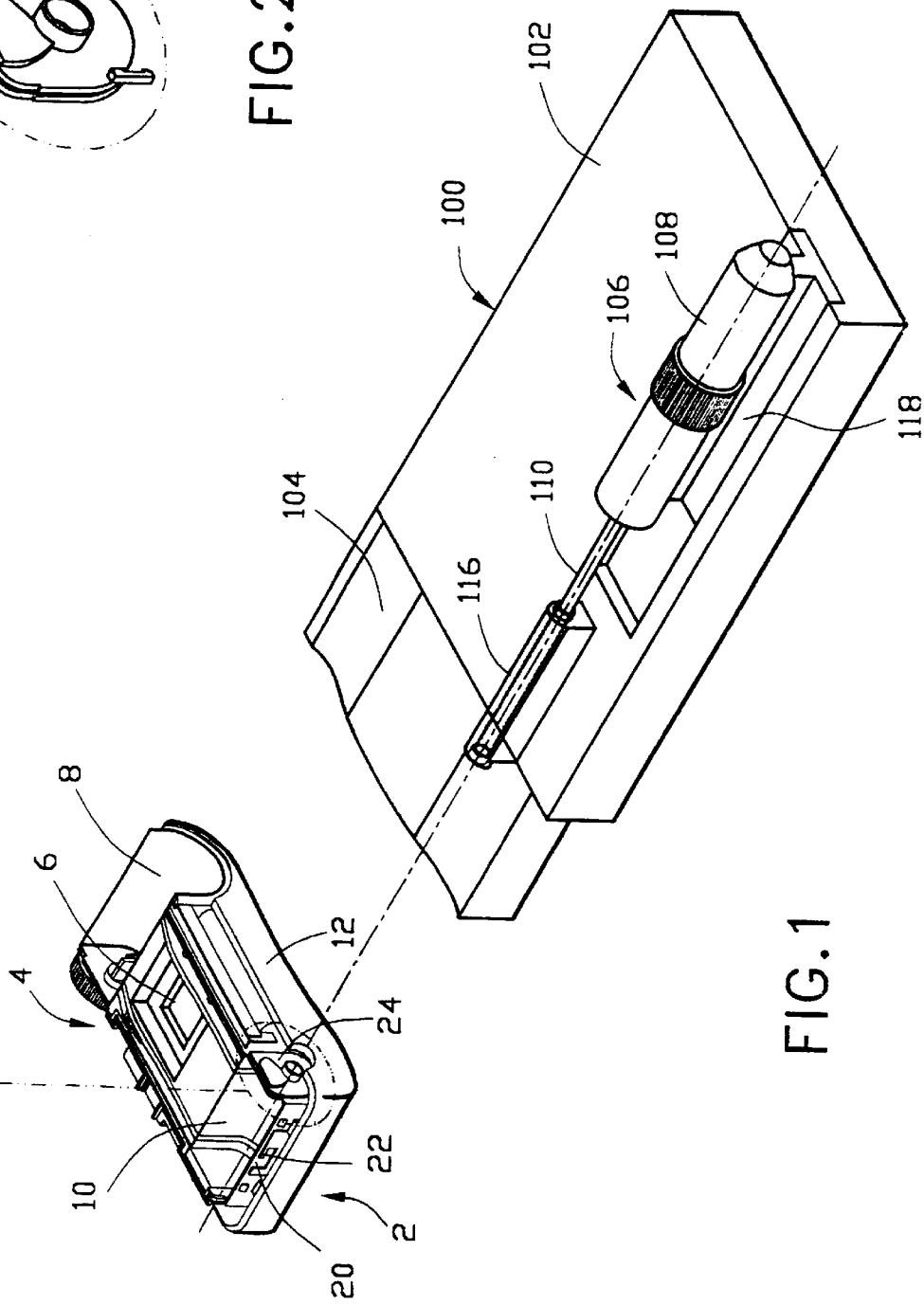

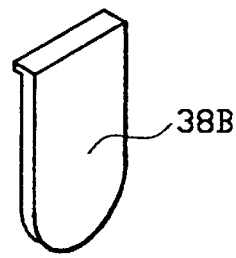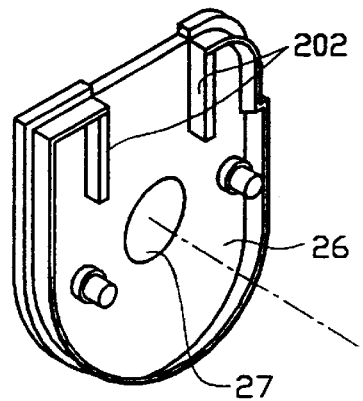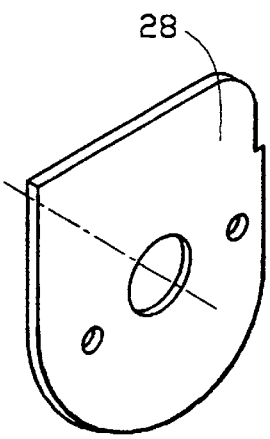
FIG.16
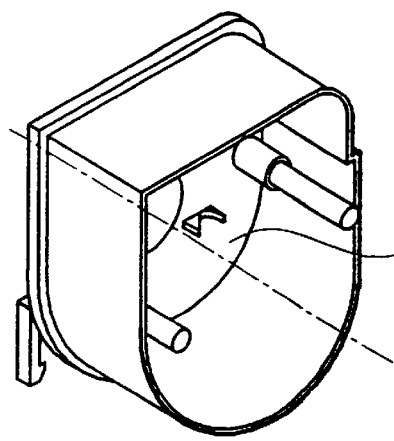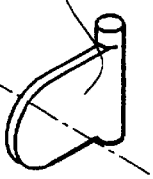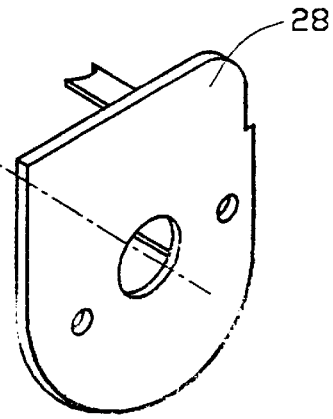
FIG.17

SINGLE-USE CAMERA AND METHOD OF FILM LOADING

FIELD OF THE INVENTION

The present invention relates to a camera, and in particular to a camera of the single-use type, and to an improved method of loading of film into such cameras.

BACKGROUND OF THE INVENTION

In recent years, cameras of the type known as disposable or single-use cameras have grown in popularity. These cameras consist of a roll of film preloaded into a simple, inexpensive camera housing having an exposure window and a film cassette-receiving chamber on one side of the exposure window, and a film-receiving chamber on the other. The film is typically loaded such that the camera is ready for immediate use by a purchaser. Once all of the film in the camera has been exposed, the entire camera may be sent by the user to a film processing company which removes the film from the camera and develops the pictures.

Disposable cameras are available which utilize a variety of film formats, including conventional 35 mm films. A "roll" of such film consists of a length of film prewound in a generally cylindrical housing or film cartridge or cassette. During the assembly of disposable cameras, the free end or tail of the film ordinarily is pulled from the film cartridge and connected to a winding spool, and the winding spool and film cartridge are assembled in the film-receiving chambers on opposite sides of the exposure window in a front portion of the camera housing. A rear housing portion is then assembled to the front housing portion to enclose the film therein. Once the housing has been assembled to prevent light from exposing the film, the winding spool may be rotated to wind the film from the cartridge onto the spool to place the camera in condition for use. As pictures are taken, the film is rewound frame-by-frame from the winding spool back into the film cartridge.

There are problems associated with the use of a winding spool in the disposable cameras described above. Most notably, since the tail of the film is connected to the winding spool, advancing the film after the exposure of a frame causes the winding spool to turn, and this creates a resistance to the film movement. To overcome this resistance, more force is required to operate the film advancement mechanism after frame exposure.

One proposed solution is to use a substantially cylindrical spoolless film-receiving cartridge. The film supply cartridge and film-receiving cartridge are then loaded into the film-receiving chambers on opposite sides of the exposure window in the front portion of the camera housing, and a rear cover is assembled thereto. While this arrangement eliminates the winding spool and thus the resistance it creates to the advancement of the film, the need for a film-receiving cartridge adds weight to the camera and increases its manufacturing cost. Furthermore, since the film is wound from the supply cartridge to the receiving cartridge outside of the camera, this procedure must be performed under darkroom conditions, slowing production and adding to manufacturing costs.

It is also known to use a separate winding tool to which the leading end of the film is attached which is placed into the film-receiving chamber and rotated to unwind the film from the cassette. After winding, the tool is removed and the back of the camera fitted onto the camera body. This technique also requires darkroom conditions, slowing production and increasing costs.

There therefore exists a need for a disposable or single-use camera which not only overcomes the problems associated with the use of a winding spool in these cameras, but allows daylight loading and which does so without increasing the weight of the camera or its manufacturing costs.

SUMMARY OF THE INVENTION

According to a first aspect of the invention there is provided a camera comprising a main body defining a chamber for receiving, in use, a film-containing cassette, and a film-receiving chamber for receiving, in use, a roll of film unwound from said cassette, the film extending between said chambers over an exposure window, an aperture defined adjacent said film-receiving chamber for insertion of the film-winding tool, a movably mounted shutter movable between an open position where said aperture is unobscured, and a closed position where said aperture is closed, and resilient means to urge said shutter into the closed position.

The shutter ensures that after the film winding tool is withdrawn from the film-receiving chamber, no light enters film-receiving chamber.

In the preferred embodiment the aperture is defined in a separate access member which at least partly closes one end of the film-receiving chamber. The access member comprises a pair of parallel spaced plates including an inner plate facing into the film-receiving chamber and an outer plate, the plates defining coincident apertures, and the movable shutter part is mounted so to be movable in a plane parallel to said spaced plates between a closed position where the cover part lies between said apertures, and an open position wherein said apertures are unobscured. The shutter part is pivotably mounted on the access member. The resilient means may be a leg spring but other springs such as a leaf spring or coil spring can equally be used.

The access member may be provided with releasable locking means to releasably secure the member to the main body. The locking means may comprise at least one depending leg having a claw portion extending from the end thereof for engagement in a corresponding aperture or recess defined in the main body. The periphery of the access member may be provided with a groove defined between the periphery of the pair of spaced plates, with the main body having, adjacent the end of the film-receiving chamber, an inwardly-directed flange which engages the groove of the access member.

Although the access member is preferably a separate member for ease of assembly, it can alternatively be formed at least partly unitarily with the main body of the camera at the end of the film-receiving chamber.

The access member may be provided with a removable plug having a portion dimensioned to fit into said aperture thereof. The axial extent of said portion of the plug receivable in the aperture is sufficient to extend beyond said movable shutter when fitted adjacent the inner plate, to allow the cover part to be held in an open position when the plug is inserted therein.

In alternative arrangements the movable shutter can be slidably mounted on the camera, or alternatively, pivotably mounted so as to pivot about an axis perpendicular to the axis of the aperture. In a further alternative, the shutter may be constructed in more than one piece for example comprising a pair of separate elements which together co-operate to close the aperture.

In a further aspect the invention resides in a method of loading film into a camera which comprises a main body defining a chamber for receiving a film-containing cassette, and a film-receiving chamber arranged on the opposite side of an exposure opening for receiving unexposed film, and defining at one end of the film-receiving chamber an aperture having a movably mounted shutter movable between an open position where said aperture is unobscured and a closed position in which said aperture is closed, and having resilient means to urge the shutter into the closed position, the method comprising the steps of: a) moving said shutter against the action of said resilient means to an open position, and inserting an end portion of an elongate film winding tool through said aperture and into said film-receiving chamber; b) withdrawing a free end of the film from the film cassette; c) with a rear cover of the camera removed, attaching the free end of the film to the film tool; d) securing said rear cover of the camera to the camera main body; e) rotating said winding tool to unwind the film from the cassette into the film-receiving chamber; and f) withdrawing the film winding tool from the film-receiving chamber and from said aperture, and allowing the shutter to close said aperture.

At step a) the movable shutter is preferably manually opened by engaging a portion thereof and moving the shutter into the open position prior to insertion of the winding tool.

In an alternative embodiment the shutter is held open by insertion of a plug into said aperture from inside the film-receiving chamber, the plug having a plug portion received within the aperture of sufficient axial dimension to hold the shutter in an open position. As the film winding tool is inserted into said aperture it abuts the plug which is pushed out of the aperture and into the film-receiving chamber from where it is retrieved, the tool preventing the shutter from closing as the plug is pushed out.

After step f) as defined above, the aperture may be closed by a separate plug part fitted from outside the camera to give additional light-tight security.

The film winding tool may comprise an elongate rod having a split end portion for receiving the leading end of the film connected to a rotatably-mounted body, the rod extending through a fixed sleeve having an end portion which at step b) abuts the camera adjacent said aperture of the film-receiving chamber. The film winding tool is slidably supported on a base part, the tool being slidably moved towards the camera to insert the tool end into the camera at step b).

In alternative arrangements where the shutter opens inwardly of the camera, or alternatively is provided with an inclined cam surface, at step a) the film winding tool is inserted into the aperture abutting the shutter and pushing it open.

In a further aspect, the invention resides in a method of loading film into a camera which comprises a main body defining a chamber for receiving a film-containing cassette, and a film-receiving chamber arranged on the opposite side of an exposure opening for receiving unexposed film, and defining at one end of the film-receiving chamber an aperture having a movably mounted shutter to close said aperture, the method comprising the steps of a) with said shutter in an open position, inserting an end portion of an elongate film winding tool through said aperture and into said film-receiving chamber; b) withdrawing a free end of the film from the film cassette; c) with a rear cover of the camera removed, attaching the free end of the film to the film tool; d) rotating said winding tool to unwind the film from the cassette into the film-receiving chamber; e) withdrawing the film winding tool from the film-receiving chamber and moving the shutter into a closed position where the aperture is obscured; and f) securing said rear cover of the camera to the camera main body.

BRIEF DESCRIPTION OF THE DRAWINGS

Preferred embodiments of the invention are now described, by way of example only, with reference to the following drawings in which:

FIG. 1 illustrates a disposable camera in accordance with an embodiment of the invention being placed on a film winding assembly;

FIG. 2 is a detail of a film-winding tool access member of the camera of an embodiment of the invention;

FIG. 16 shows an enlarged part-disassembled view of a third embodiment of the access member;

FIG. 17 shows an enlarged part-disassembled view of a fourth embodiment of the access member;

DETAILED DESCRIPTION OF THE PREFERRED EMBODIMENTS

Figure 3:
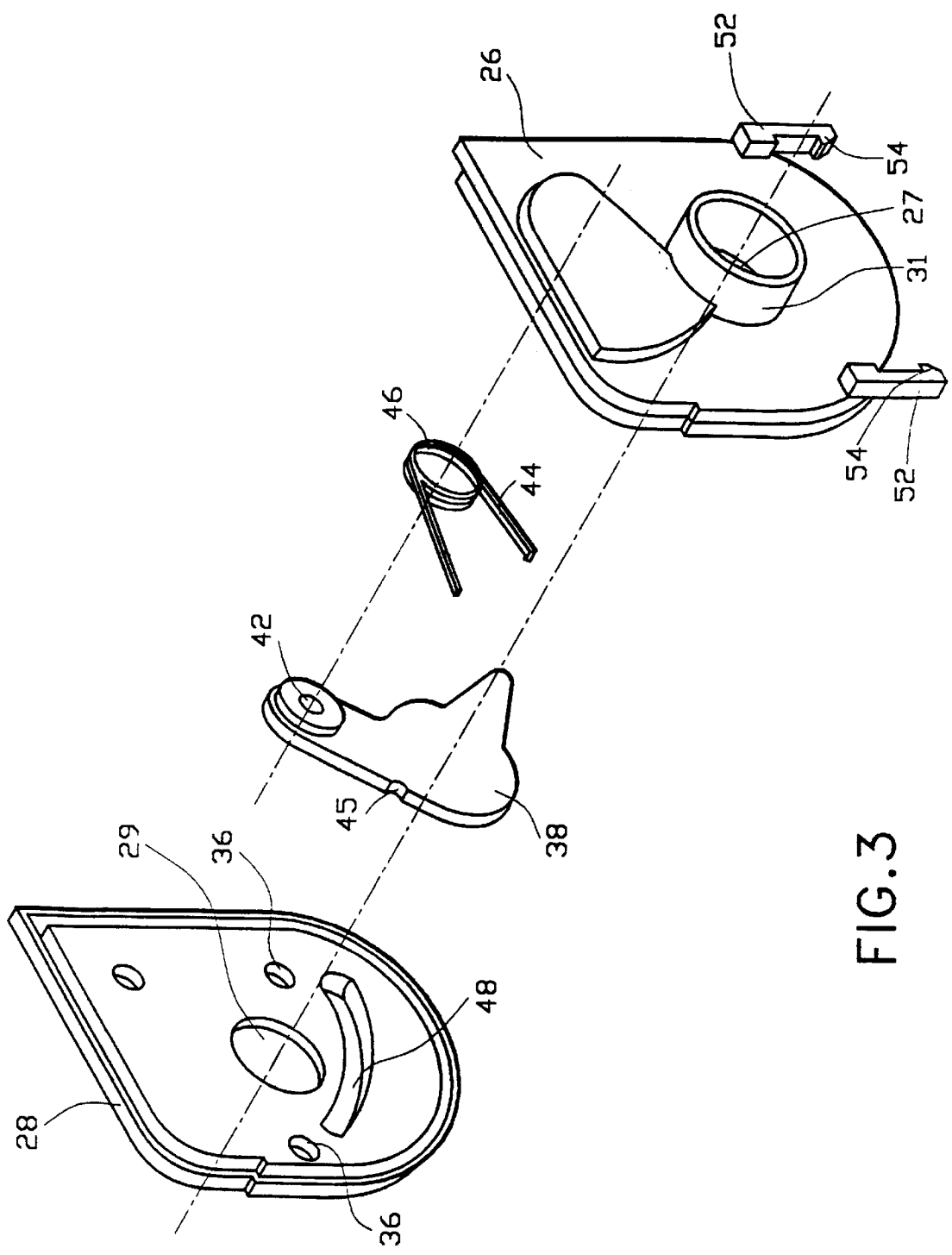
FIG. 3 is an exploded view of the access member of FIG. 2.

Referring to the figures, there is illustrated a preferred embodiment of a single-use camera 2 in accordance with the present invention. Although the term single-use is utilised it is intended that the camera may be re-used by the manufacturer after the exposed film has been removed therefrom, and the camera subjected to various quality checks and replacement of deficient parts as appropriate. As best seen in FIG. 1, camera 2 includes a main body 4 incorporating the principle functional components of camera 2, including an exposure window 6, a cassette-receiving chamber 8 for receiving a film cassette or patrone 9 on one side of exposure window 6, and a second film-receiving chamber 10 on the opposite side of exposure window 6. Main body 4 is encased in a housing including a front housing portion 12 and a rear cover 14 which cooperate to protect the main body 4 from exposure to light, dirt and moisture. A film passageway for the film to travel between the film chambers 8 and 10 is defined between the rear cover 14 and opposed region of the main body 4. Camera 2 also incorporates conventional functional components, including a view finder window, an exposure shutter mechanism, an exposure shutter actuating member, a film advancing mechanism and the like, none of which are shown in detail as these are well known to those skilled in the art. Optionally, camera 2 may also include an electronic flash and associated circuitry (not shown), as well as a battery for operating the electronic flash. A removable battery cover may provide access to battery so that the battery may be replaced if and when needed.

Figure 7:
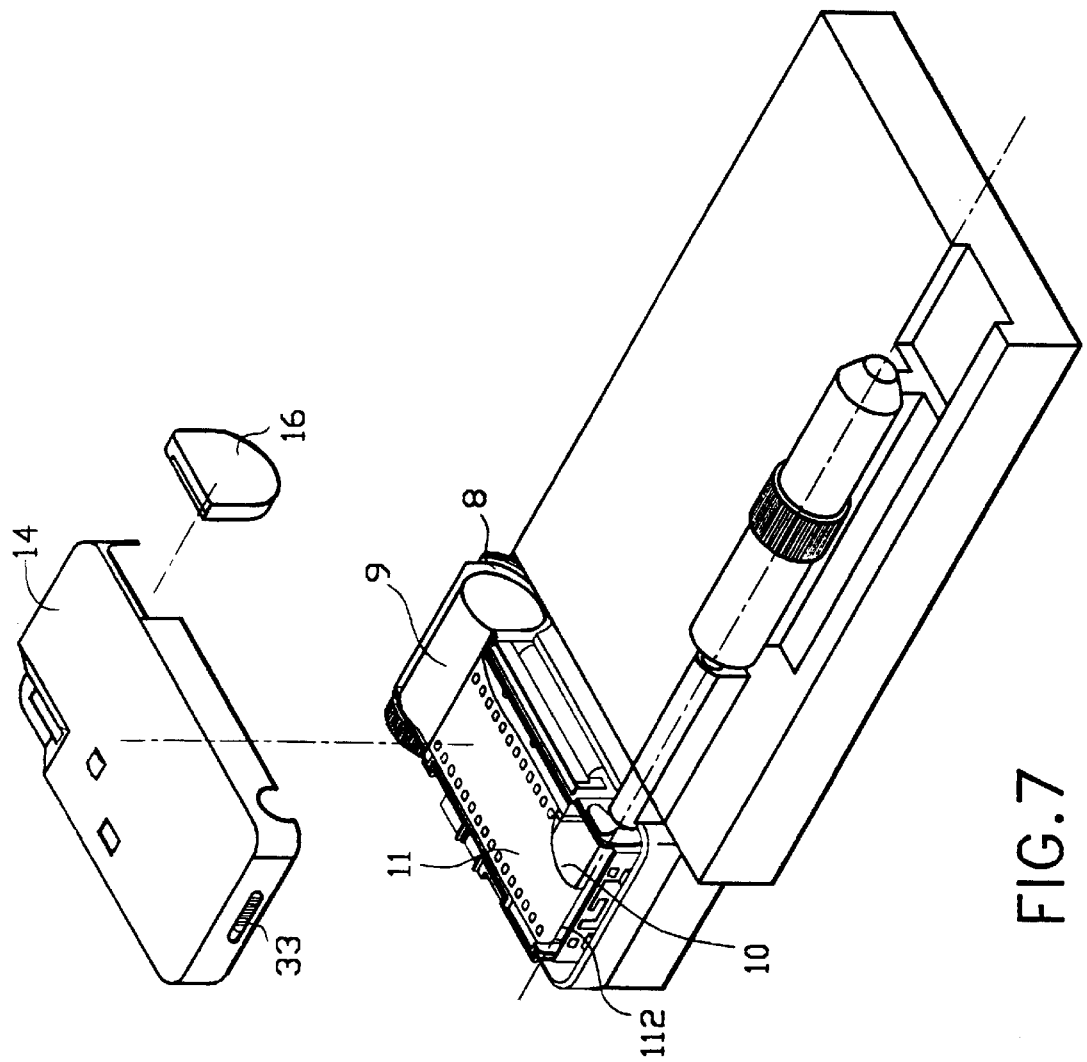
FIG. 7 shows the film cassette inserted into the camera and the film attached to the winding tool.

Main body 4 and front housing portion 12 may be fastened together in any conventional means such as with screws, snap-fit connectors, adhesive, ultrasonic welding and the like. In a preferred embodiment, the rear cover 14 is removably fitted to the main body 4 to allow easy opening by manufacturer and user. This is achieved by providing at opposite edges a releasable locking means in the form of a latch including a finger slide 33 having an inwardly directed pin (not visible). The latch is movable between an open position as shown in FIG. 7 where the rear cover 14 can be simply push-fitted onto the main body 4, with the pin extending into the mouth of a recess 20 (FIG. 1) formed on the edge of the main body 4, and a locking position where the pin engages beneath a lug 22 moulded on the main body 4.

The main body 4, and front and rear housing parts 12 and 14 define an opening at the lower end of the cassette receiving chamber 8, which is closed in use by a removable plate 16 (FIG. 7) allowing removal of the film cassette 9 through this opening once the film has been exposed and wound back into film cassette 9. The plate 16 and adjacent parts of the main body 4 are provided with appropriate adaptations in the form of co-operating grooves on the plate 16 and flanges on the main body 4 which together ensure light-tight closure of the opening.

Figure 4:
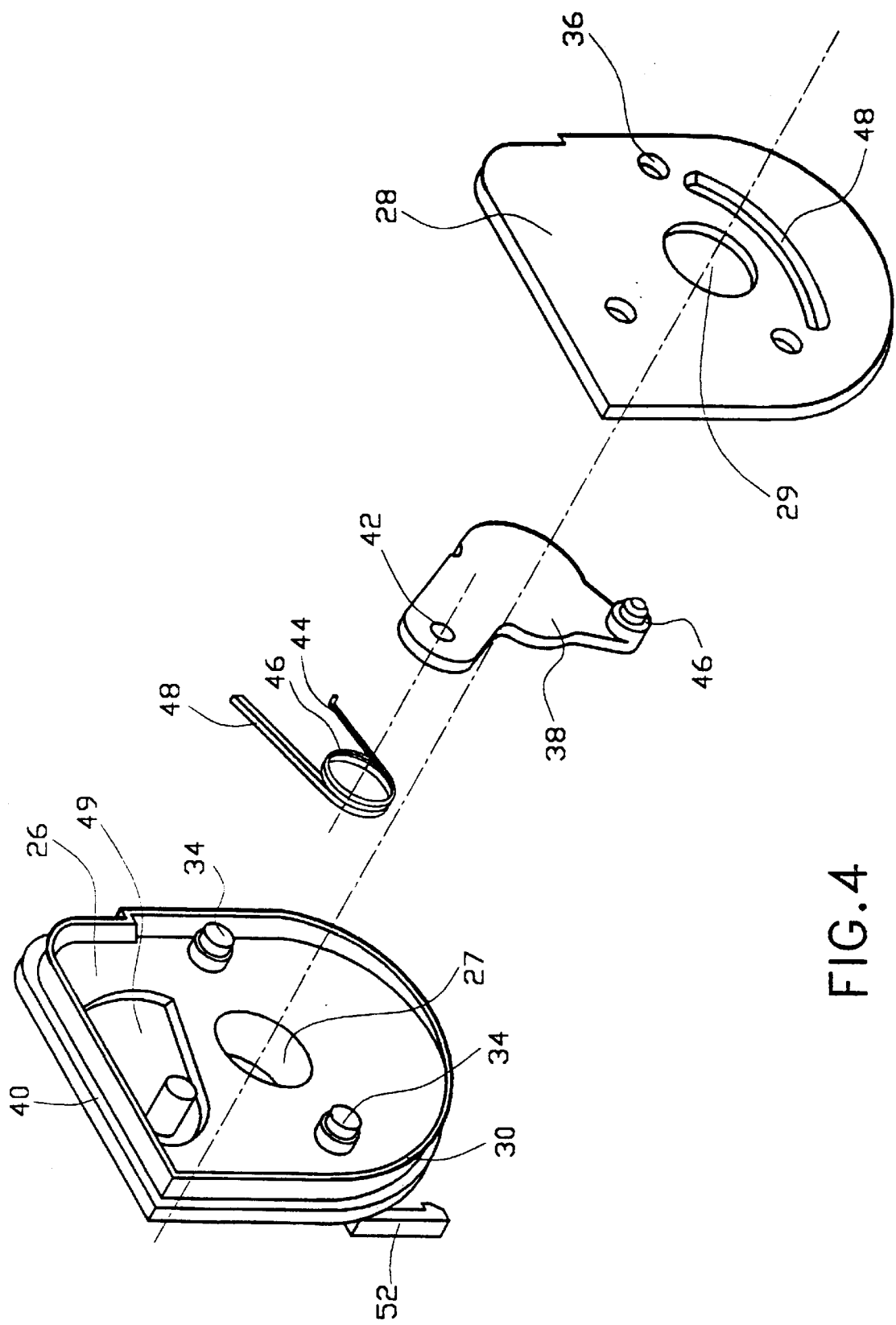
FIG. 4 is an exploded view of the access member of FIG. 3 from the opposite direction.

The second film-receiving chamber 10 is closed at its lower end by a plate-like member 24 which serves as a winding tool access member. FIGS. 3 and 4 show the access member 24 in a disassembled condition. FIG. 3 shows the access member 24 from the direction generally outside and below of the camera 2. The access member 24 comprises an outer plate 26 which is the lowermost when fitted in the camera, and an inner plate 28 which faces inwardly to the film-receiving chamber 10. Outer plate 26 is provided with a flange 30, extending around the periphery but spaced a small distance therefrom. Both plates 26 and 28 have central apertures 27 and 29 respectively through which a winding tool for film winding can be inserted, as discussed in further detail below, the aperture 27 being bound by a collar 31. The outer plate 26 is also provided with a number of supporting pillars 34 which each may have end portions of reduced diameter to fit into corresponding apertures 36 in the inner plate 28, to thereby assist in maintaining the plates 26 and 28 accurately spaced apart from each other. The plates 26 and 28 are secured together by suitable means such as adhesive or ultrasonic welding, or alternatively by a snap-fit connection or similar.

Figure 14:
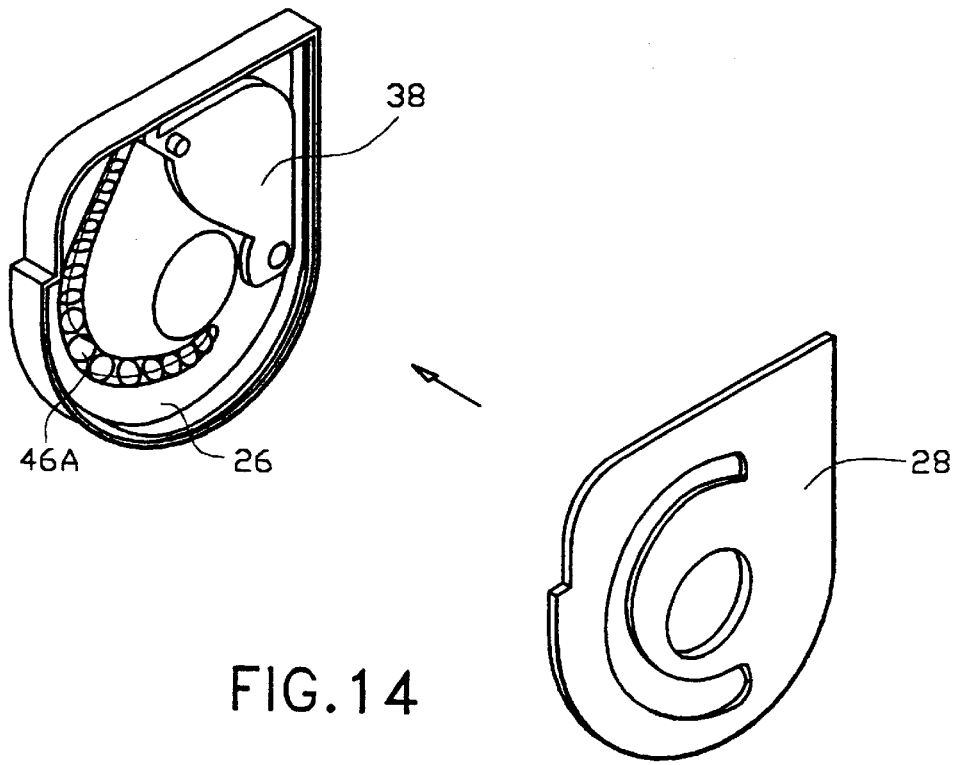
FIG. 14 shows as enlarged part-disassembled view of a second embodiment of the access member in an open condition.
Figure 15:
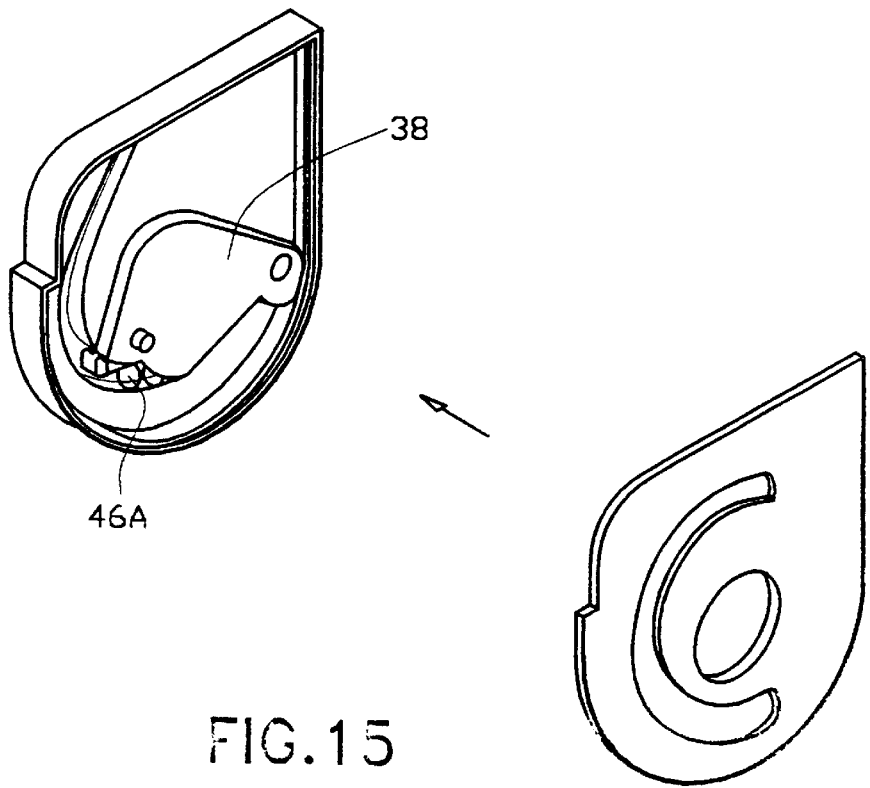
FIG. 15 shows an enlarged view of the access member of FIG. 14 in a closed condition.

Between the plates 26, 28 there is arranged a shutter plate 38 pivotally mounted on pivot 40 which extends through an aperture 42 in the shutter plate, whereby the plates 26, 28 and shutter plate constitute an access assembly. A leg spring 46 is arranged between the shutter plate 38 and plate 26, one leg 48 engaging the inner side of the flange 30, and the other leg 44 engaging an edge of the plate 38 and sitting in a detent 45, so that the plate 38 is urged in the anti-clockwise sense as viewed in FIG. 3 so the main part of the plate 38 lies between the apertures 27 and 29. The spring 46 sits in a recessed region 49 formed in plate 26. Although a leg spring is shown, various other resilient means such as a leaf spring or coil spring 46A (as seen in FIGS. 14 and 15) might equally be provided to appropriately bias the shutter plate 38. The shutter plate 38 is also provided with an actuating projection 46 which projects through arcuate slot 48 in the inner plate 28, thereby allowing a user to move the shutter plate into an open position where the apertures are not obscured, by rotating the shutter plate in a clockwise sense.

The access member 24 is fitted at the bottom of the film-receiving chamber 10. The outer and inner plates 26, 28 when connected define therebetween a groove 51 which sits over a flange extending from the sides at the lower part of the film-receiving chamber 10. To hold it in place, legs 52 may be provided on the outer plate 26 having claws 54, at their ends. As the access member 24 is fitted, the legs 52 snap-fit into a corresponding openings provided in the main body 4. This allows the access member 24 to be releasably secured onto the main body 4.

As an alternative, the access member 24, or one or other of the plates 26, 28 may be unitarily formed with the camera body at the lower part of the chamber 10; however the provision of a separate member facilitates its assembly. It also means that different members not in accordance with the invention may be fitted to the camera body, for example to accommodate a spool or a film-receiving cassette; thus, a single camera body may be utilised with various film-receiving arrangements.

As is known in the art single-use cameras are generally loaded with unexposed film by the manufacturer, the film being fully unwound from the film cassette into a film-receiving chamber before being sold to the user. The term "exposed" may include film which has been partly pre-exposed by the manufacturer with messages or decorative borders or similar. The user sequentially winds the film back into the cassette after each frame has been exposed by the user. FIG. 1 illustrates the winding apparatus 100 used to wind the film out of this cassette. The winding apparatus includes a main support base 102 having an end region 104 which is appropriately shaped to receive a front face of the camera. The base 102 carries a winding tool 106 having a main motor housing 108 from which protrudes a tool finger 110 in the form of an elongate rod having a split end portion 112 for receiving the free end of the film as can be best seen in FIG. 7. The finger 110 extends through a fixed support sleeve 116 fixed on the base 102. The sleeve 116 may have an inner lining of velvet or similar to prevent light from passing between the rod 110 and sleeve 116. The winding tool 106 is mounted on a slide 118.

Figure 5:
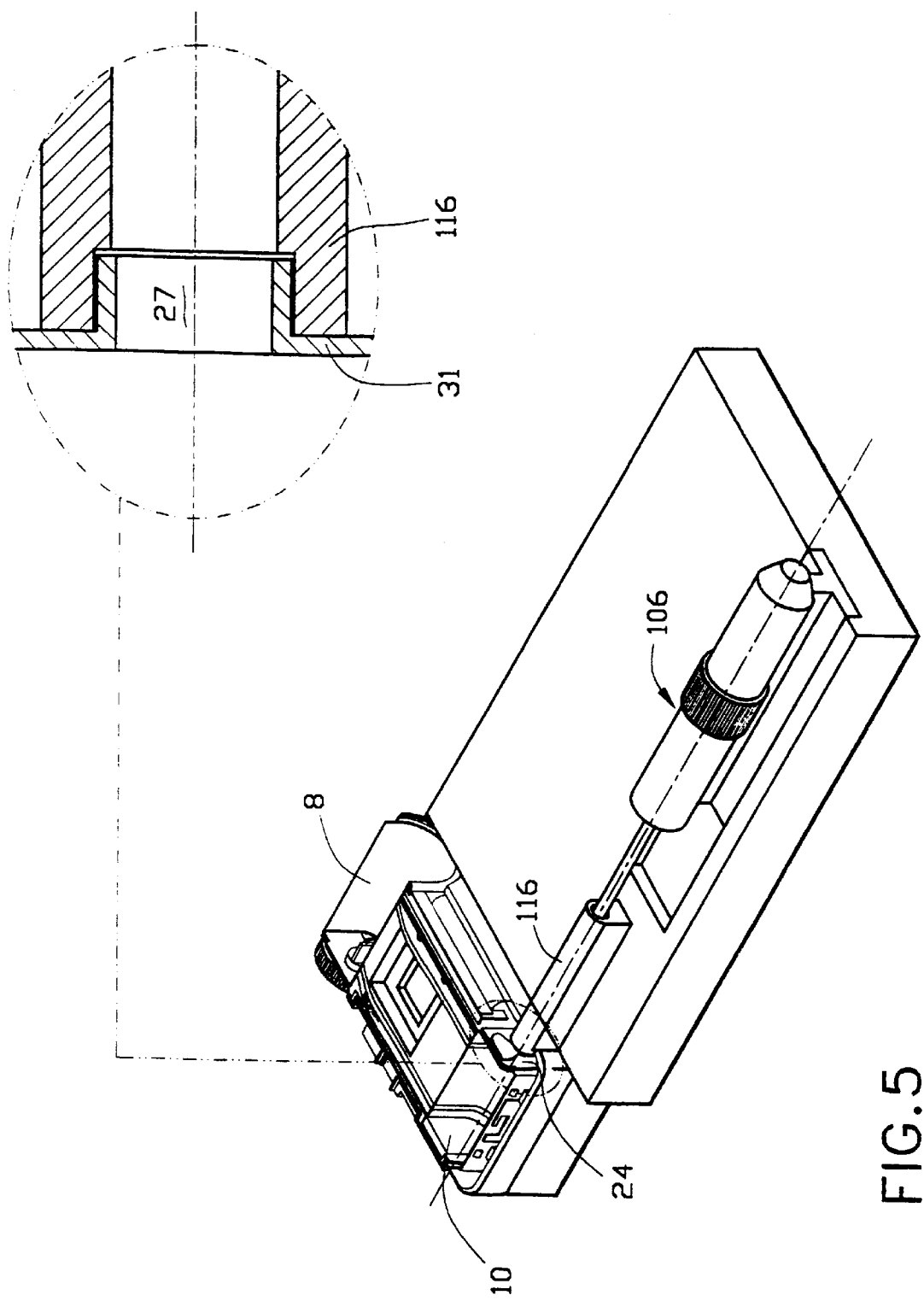
FIG. 5 shows the insertion of a film winding tool into the camera.
Figure 6:
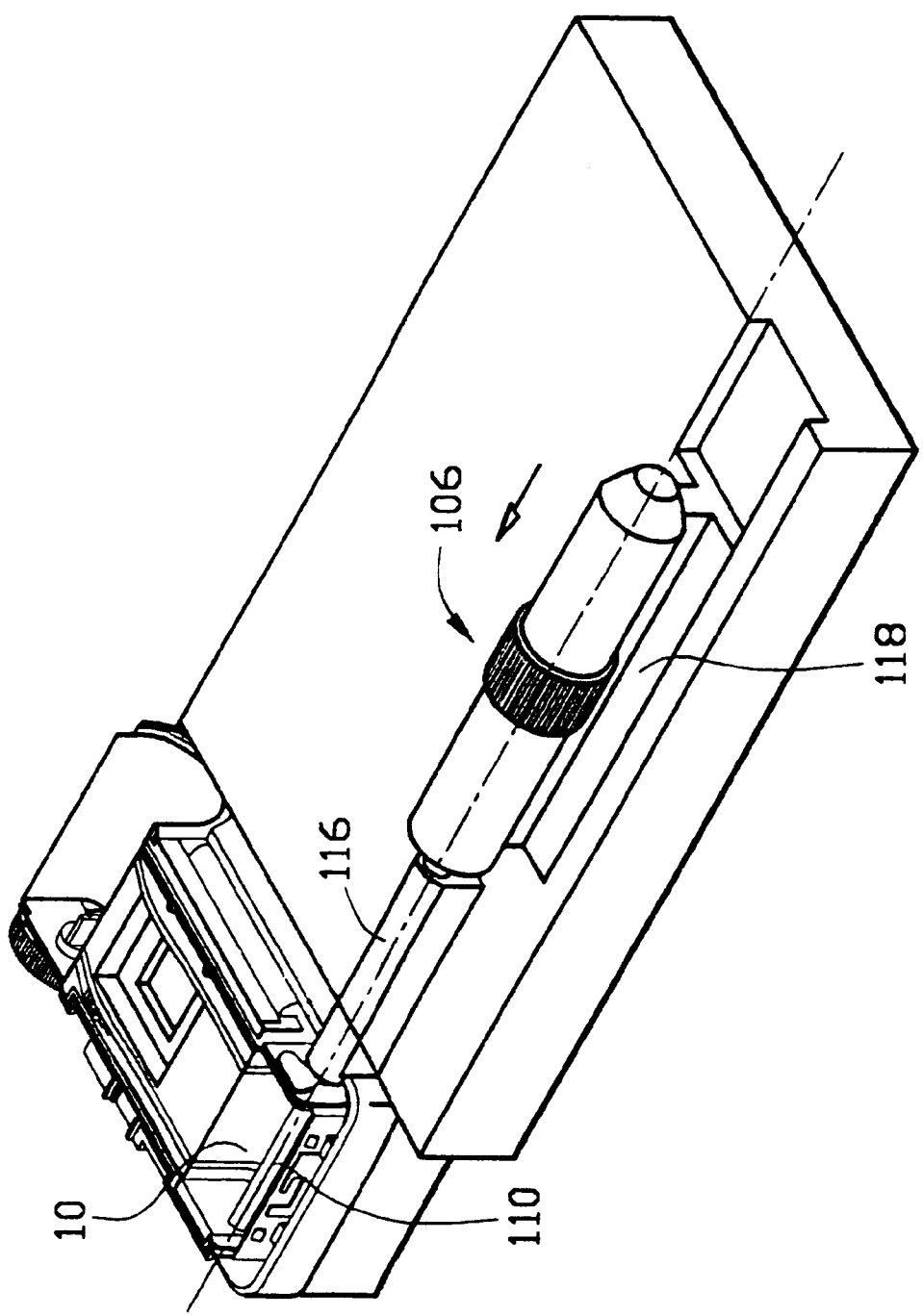
FIG. 6 shows film winding tool fully inserted into the camera.

The method of winding the film is now described. As seen in FIG. 1 the camera 2 with its rear cover 14 removed is placed on the support 104. The winding tool 106 is in its retracted position with the finger of the winding tool 110 retracted into the sleeve 116. As indicated in FIG. 5 and the camera 2 is placed on the support 104 so that an end of the sleeve 116 abuts and fits over the collar 31 of the access member 24, forming a light-tight connection therewith. Between FIGS. 5 and 6 the loader moves the shutter plate 38 by engaging the projection 46 and rotating the plate 38 into the open position by moving it to the left as shown in FIG. 3, and at the same time the tool 106 is moved towards the camera 2 so that the rod 110 extends through the apertures 27, 29 and into the chamber 10.

Figure 8:
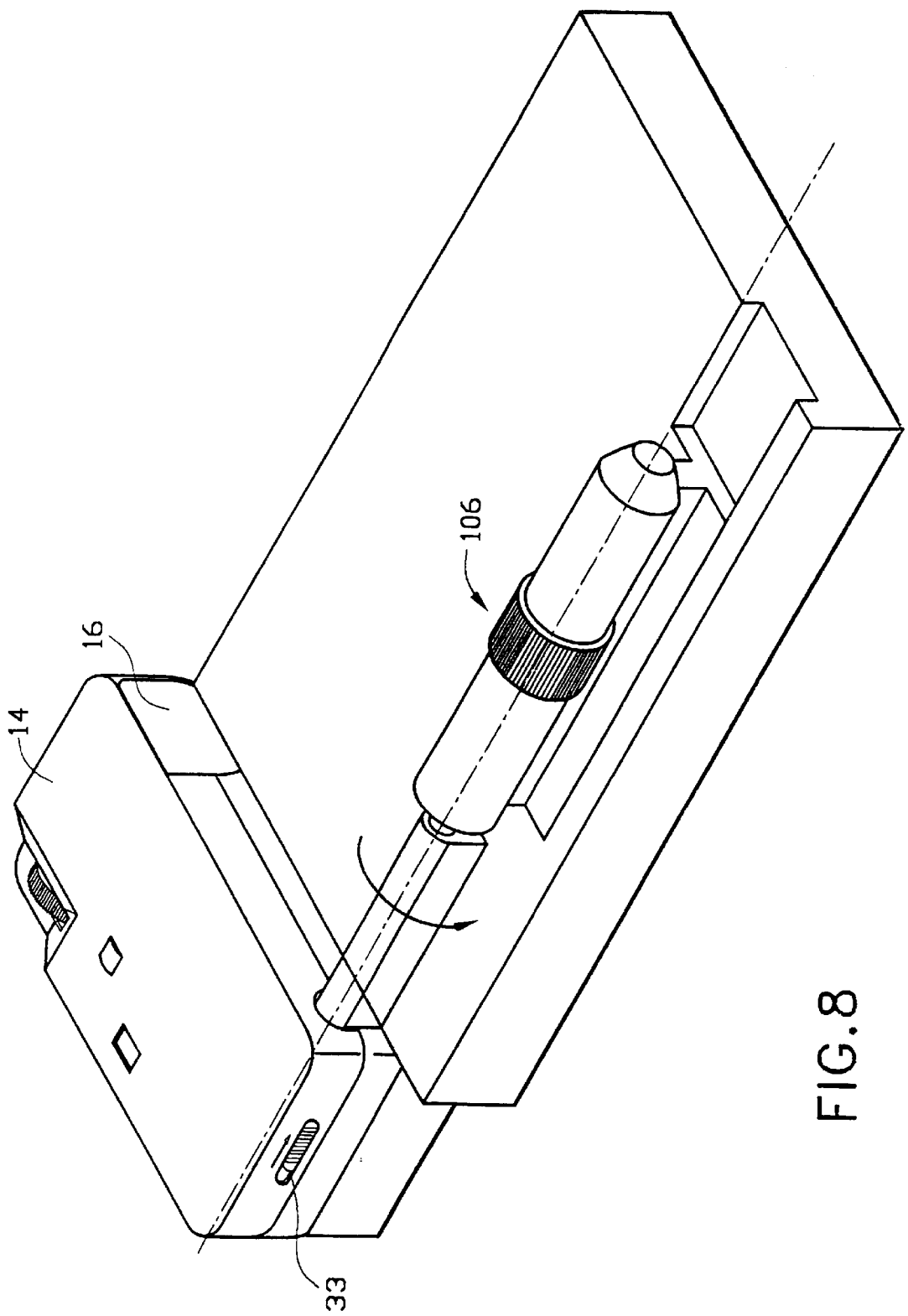
FIG. 8 shows the camera with the rear cover fitted, and the step of film winding.
Figure 9:
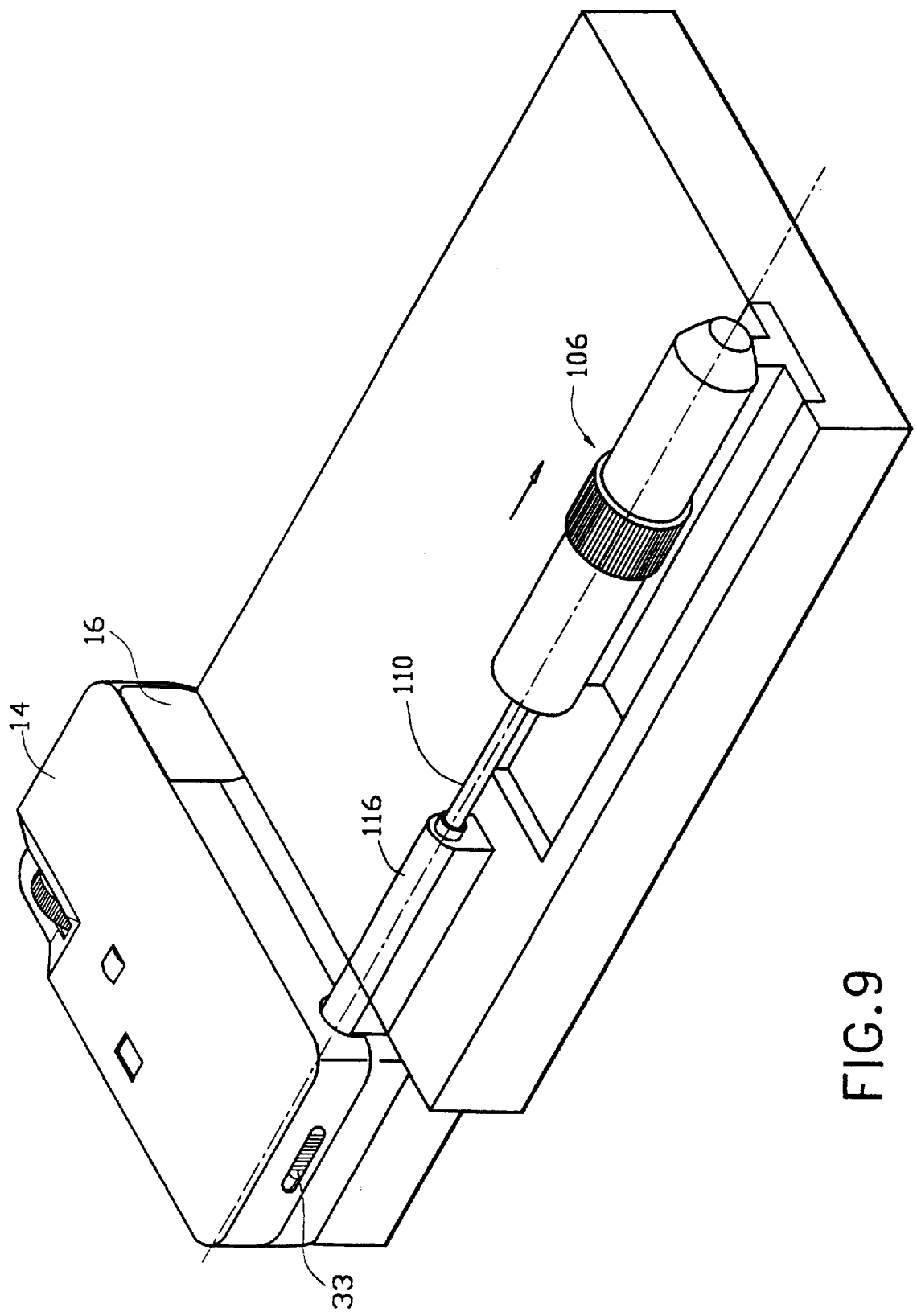
FIG. 9 shows the winding tool being retracted.
Figure 10:
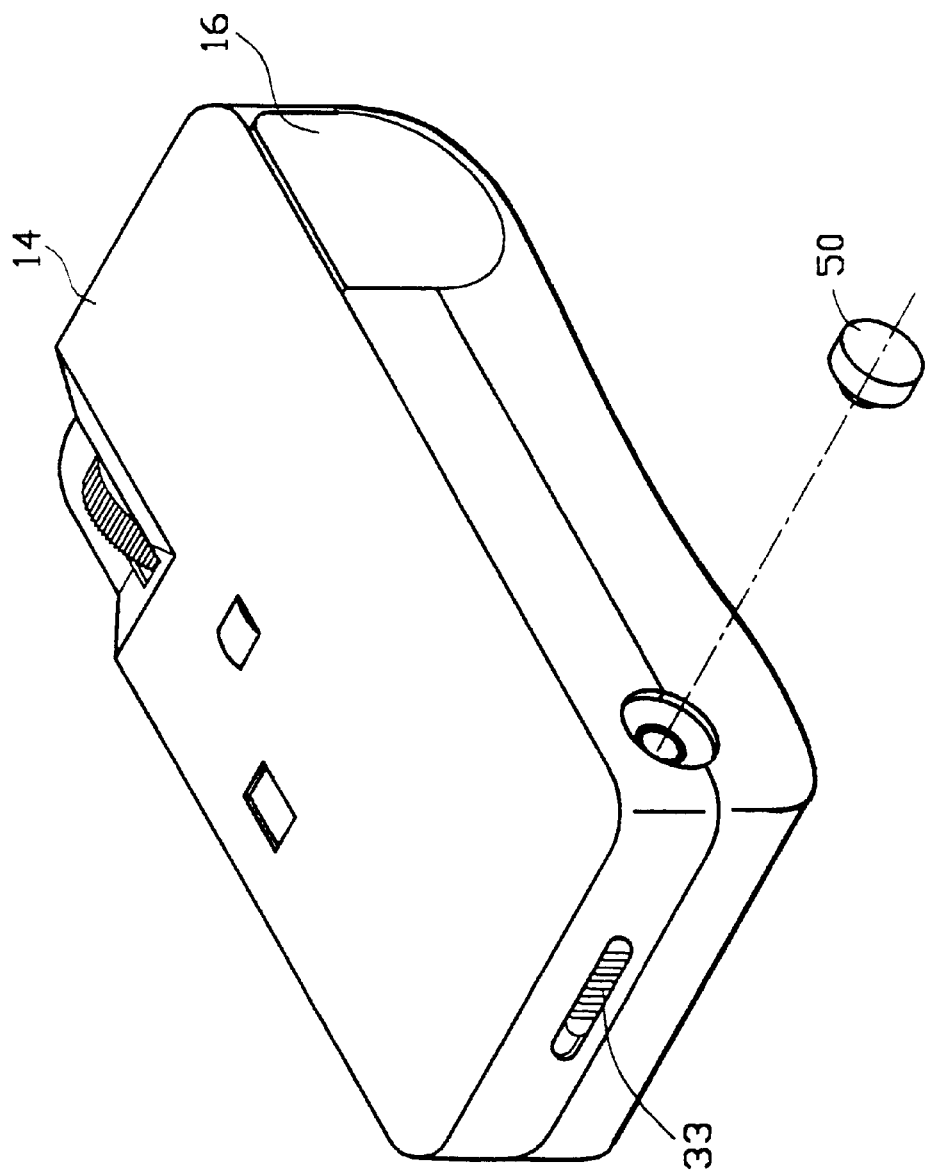
FIG. 10 shows the fitting of a safety plug.
Figure 11:
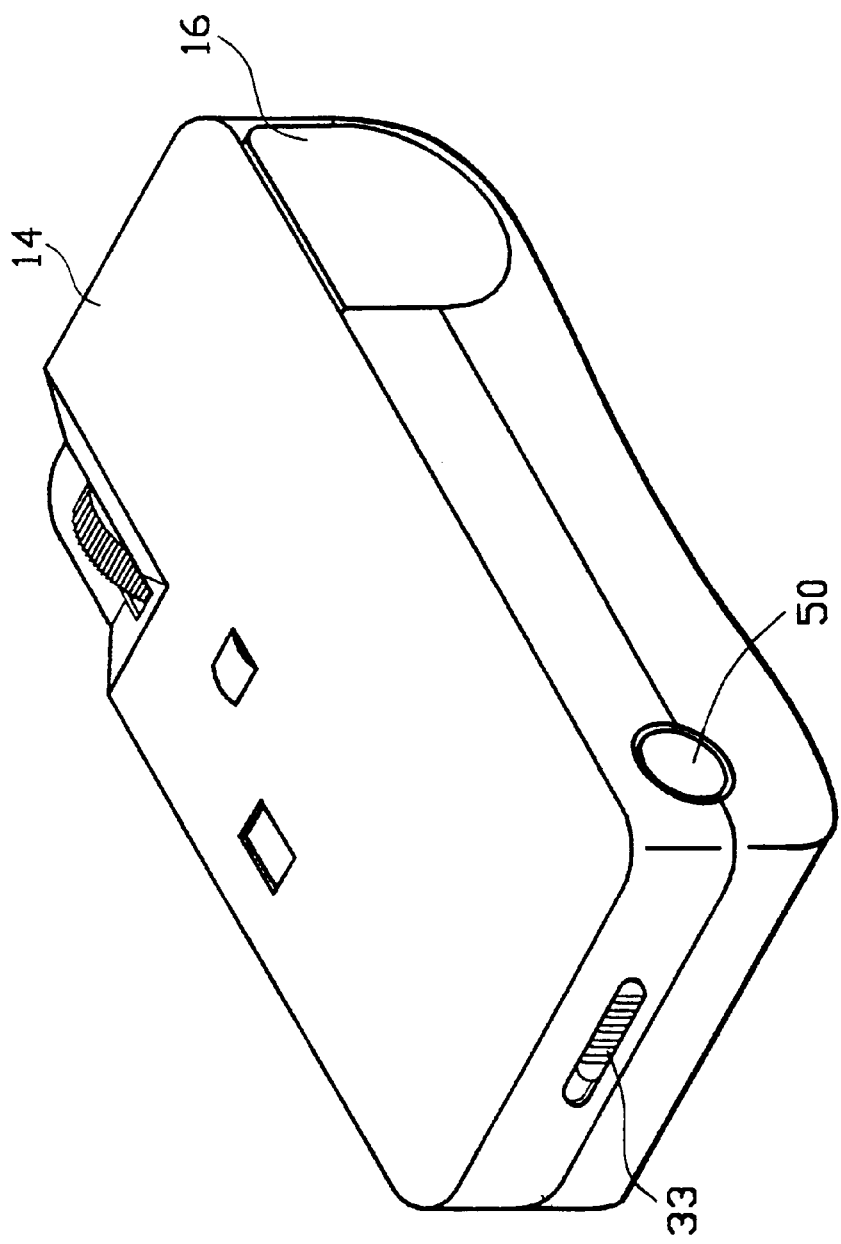
FIG. 11 shows the assembled and loaded camera ready for use.
Figure 13:
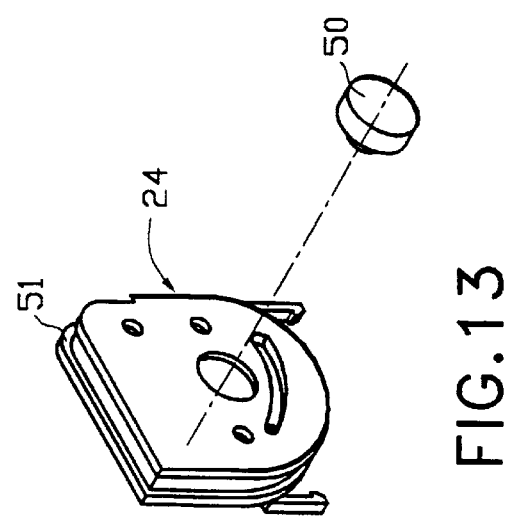
FIG. 13 shows an enlarged view of the access member and safety plug, from the opposite direction.

Thereafter, the film cassette 9 is inserted into the chamber 8 (FIG. 7) and a leading or free end portion of the film 11 withdrawn therefrom so as to extend over the exposure opening 6 where it is fitted into the split end 112 of the finger 110. The rear cover 14 of the camera is now fitted onto the main body 4, the finger slide 33 closed to secure the rear cover, and the removable plate 16 fitted to close the cassette chamber 8. As indicated in FIG. 8, the motor of the winding tool 106 is now operated to rotate the tool finger 110 in an anti-clockwise sense so as to unwind the film from the cassette 9 and into the film-receiving chamber 10. Once the film has been completely unwound from the cassette 9, which is detected by the increased winding resistance owing to the fact that the end of the film is, as is conventional, secured to a spool inside the cassette, the tool 106 is withdrawn from the camera. The end of the finger 110 detaches from the film 11 and as the end portion exits through the apertures in the access member 24 the plate 38 snaps rapidly back into the closed position under the action of the spring 46 so that the film-receiving chamber is kept light-tight. Preferably, the camera 2 is kept pressed up against the sleeve 116, as the tool 110 is retracted, thereby maintaining a light-tight connection between the sleeve 116 and collar. Should the camera 2 be removed from the sleeve 116 before the tool 110 has been retracted there could still be the possibility of light leakage around the edge of the tool 110. After retraction of the tool 110, the camera 2 may be removed from the support 104. Although not essential, as shown in FIG. 10 an additional plug 50 may be push fitted to close the aperture 27 in the outer plate 26 from the outside, in order to add additional security of light-tightness. The camera as shown in FIG. 11 is then ready for shooting.

Figure 12:
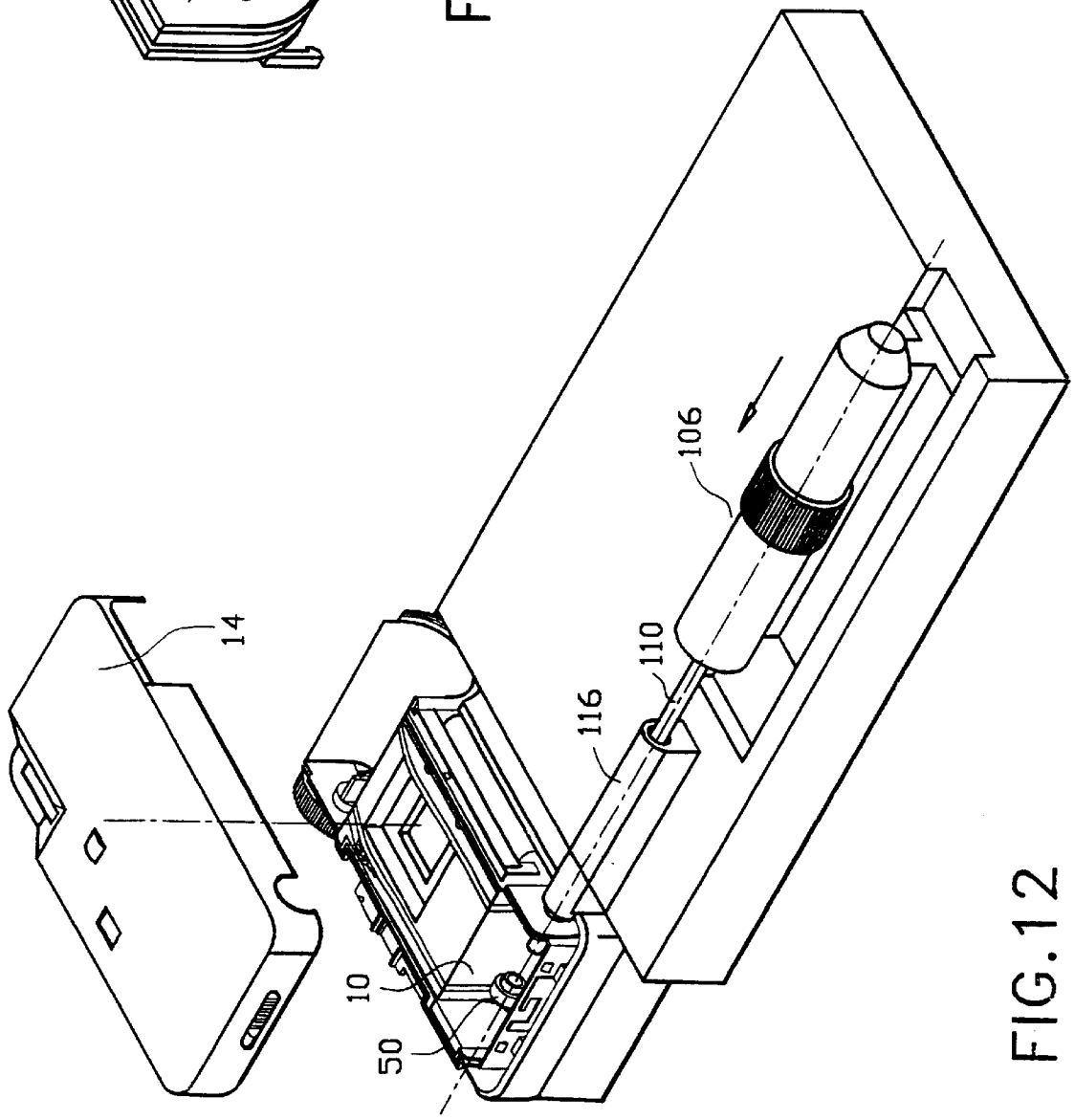
FIG. 12 shows an alternative loading step employing a plug in the access member.

In an alternative loading method illustrated with respect to FIG. 12 prior to loading the plug 50 is fitted into the aperture of the member 24 from the inside whilst at the same time the plate 38 is moved into the open position, the central portion of the plug 50 being of sufficient axial extent to prevent the plate 38 from closing under the action of the spring 46. Then, as the winding tool 106 is moved towards the camera the end of the tool 110 abuts the plug 50, and as the tool is moved further towards the camera the plug 50 is pushed out of the aperture in the member 24, the end of the finger 110 entering the film-receiving chamber 10 and preventing the plate 38 from closing. FIG. 12 shows the end of the tool 110 extending a short distance into the chamber 10, the plug 50 having just been pushed out of the aperture. The plug 50 which falls into the chamber 10 can then be manually removed and retained for later use to provide additional light tight security as described above. Use of the plug 50 in this manner assists in the loading process since the plug 50 can be pre-fitted into the plate 24 prior to loading, or even prior to the member 24 being fitted into the camera, which means that during loading it is unnecessary to manually open the cover plate 38. This can further simplify and speed up the loading process.

Although the method described above is carried out under the daylight conditions, it is still perfectly possible to load the camera in darkness, in which case the camera back need not be fitted until after loading and winding.

In an alternative embodiment, the access member 24 is similar to that described above and as illustrated in FIG. 4 except that no spring or other resilient means is provided to urge the cover plate into the closed position. Actuation means can be provided to allow the loader to access the plate from outside the camera to move it open and closed. For example, an additional projection similar to the part 46 may be provided which sits in a further arcuate slot in the plate 26, whilst an appropriate aperture is also provided in the base of the camera main body, allowing the user to move the plate 38. In this embodiment, the cover plate is manually opened before the tool 110 is inserted, and manually closed after film winding but before the sleeve 116 is moved away from the collar of the access member 24 to ensure the light-tightness is maintained.

In a further embodiment shown in FIG. 16 the access member is provided with a shutter plate 38B which is slidably mounted on the outer plate 26 between two guides 202 formed on the plate 26, whereby the plate can be moved to cover the aperture 27 or to expose this. A spring may be utilized to urge the plate 38B into a closed position. With this version the rear cover 14 of the camera requires a suitable opening to allow the plate 38B to be accessed.

In a still further embodiment shown in FIG. 17 the shutter plate is in the form of a pivotably mounted door 38C which pivots inwardly about an axis which is perpendicular to the axis of the aperture. Here some resilient means as described above, such as a leg spring, are also provided to urge the door into a closed position. The end of the tool 110 again engages the door as it is inserted into the aperture to open it, whilst as the tool is removed the door 38C snaps shut.

Figure 18:
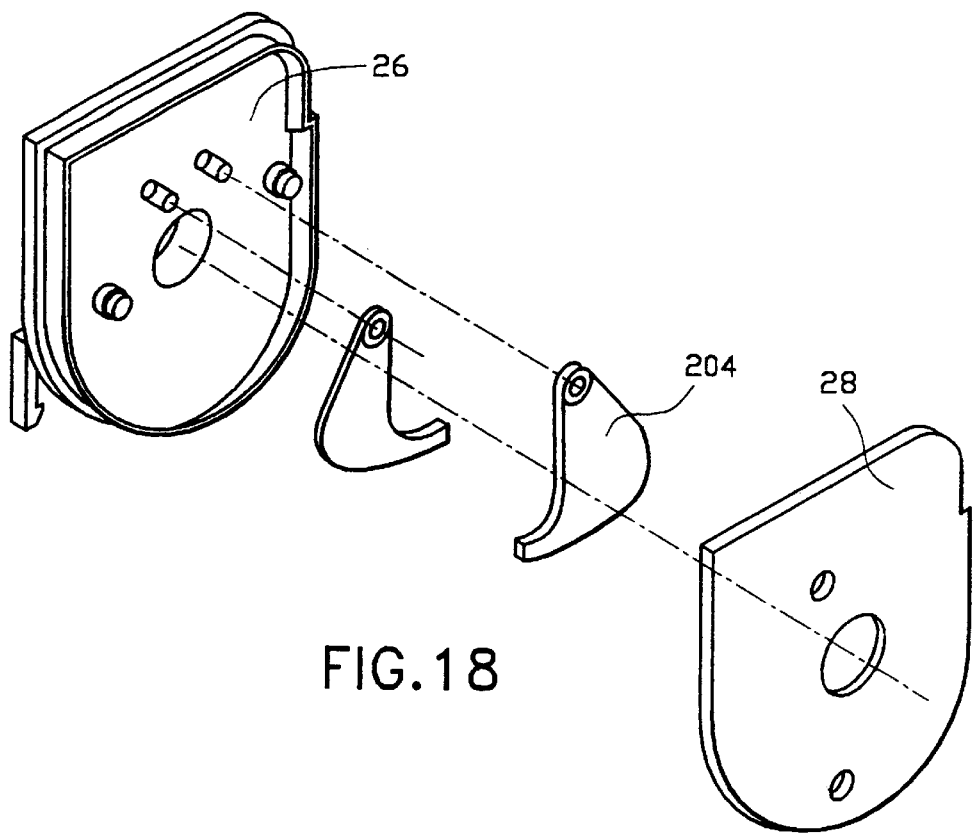
FIG. 18 shows an enlarged part-disassembled view of a fifth embodiment of the access member.

In a still further embodiment shown in FIG. 18 the shutter plate may be in the form of a pair of blades 204 which are pivotably mounted on the plate 26 and which can be moved together to obscure the aperture or moved apart to expose the aperture. Again, some resilient means such as a springy metal or plastics strip may be employed to urge the blade 204 together. Means to allow access to blades 204 from externally of the camera, such as appropriate apertures or slots in the plate 26 and in the corresponding cover of the camera are required. Such means should provide a light-tight connection to the blades 204. Although the arrangement utilizes a pair of blades, other arrangements including greater numbers of blades are possible.

Figure 19:
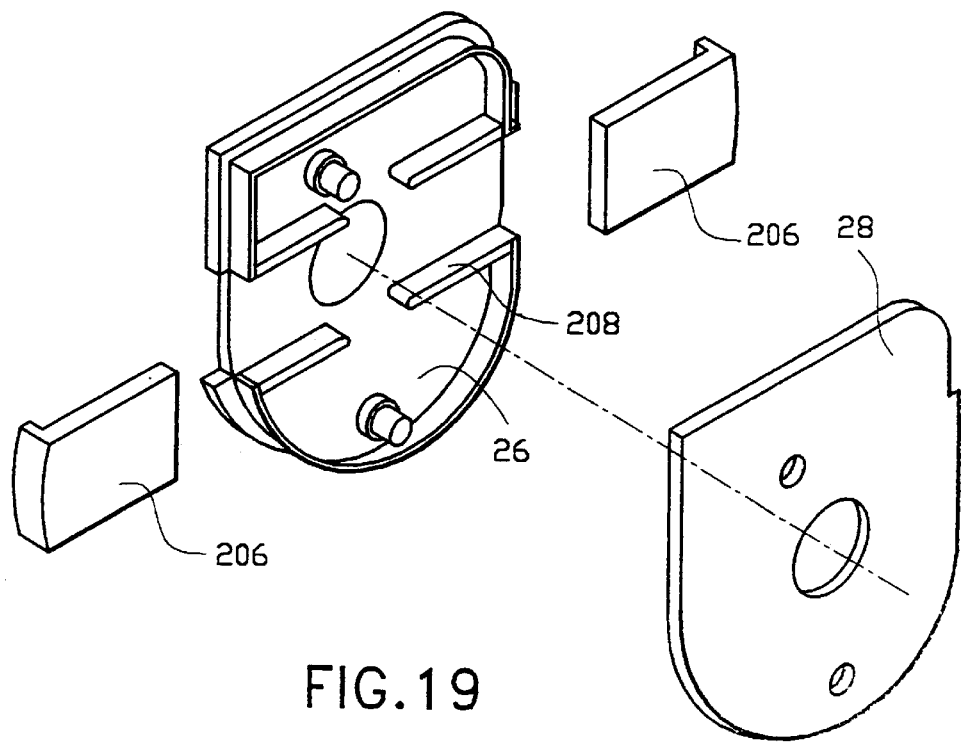
FIG. 19 shows an enlarged part-disassembled view of a sixth embodiment of the access member.

In a still further embodiment shown in FIG. 19, the shutter plate may be in the form of a pair of blades 206 which slide in opposed guides 208. The blades 206 may be sprung by simple coil springs into the closed position. Access to the plates 206 is required in the front and rear cover parts of the camera to allow the user to manually move the two blades 206 from externally of the camera.

In a still further alternative which is not illustrated, the shutter plate may be provided with an inclined cam surface facing the lower aperture 27 so that as the finger of the tool 110 is pushed into the aperture 27 it engages the cam surface of the plate 38 urging the plate 38 away from the aperture, so that tool 110 can be pushed through the access plate 24 and into the chamber 10. This arrangement does away with the need to provide means to manually move the blade to open the shutter before the tool can be inserted.

As discussed above, with the camera described above all of the loading steps can be performed in daylight, which greatly simplifies loading, making it quicker, easier and more cost effective.

I claim:

1. A camera comprising a main body defining a chamber for receiving, in use, a film-containing cassette, and a film-receiving chamber for receiving, in use, a roll of film unwound from said cassette, the film extending between said chambers over an exposure window, an aperture defined adjacent said film-receiving chamber for insertion of a film-winding tool, a movably mounted shutter movable between an open position where said aperture is unobscured, and a closed position where said aperture is closed, and resilient means to urge said shutter into the closed position.

2. A camera according to claim 1, comprising a separate access member which at least partly closes one end of the film-receiving chamber, the access member defining said aperture therein.

3. A camera according to claim 2 wherein the movable shutter is pivotably mounted on the access member.

4. A camera according to claim 2, wherein the access member comprises a pair of parallel spaced plates including an inner plate facing into the film-receiving chamber and an outer plate, the plates defining coincident apertures, and the movable shutter is mounted so to be movable in a plane parallel to said spaced plates between a closed position where the shutter lies between said apertures, and an open position wherein said apertures are unobscured.

5. A camera according to claim 1 wherein the resilient means comprises a spring.

6. A camera according to claim 4 wherein the shutter is provided with a projection which extends through an arcuate slot in at least one of the spaced plates to allow a user to manually open the shutter.

7. A camera according to claim 2 wherein the access member is provided with releasable locking means to releasably secure the access member to the main body.

8. A camera according to claim 7 wherein the locking means comprise at least one depending leg having a claw portion extending from the end thereof for engagement in a corresponding aperture or recess defined in the main body.

9. A camera according to claim 4 wherein the periphery of the access member is provided with a groove defined between the periphery of the pair of spaced plates, and wherein the main body has, adjacent the end of the film-receiving chamber, an inwardly-directed flange which engages the groove of the access member.

10. A camera according to claim 4 wherein said access member is provided with a removable plug having a portion dimensioned to fit into said aperture thereof.

11. A camera according to claim 10 wherein the axial extent of said portion of the plug receivable in the aperture is sufficient to extend beyond said shutter when fitted adjacent the inner plate, to allow the movable cover to be held in an open position when the plug is inserted therein.

12. A camera according to claim 2 wherein the access member is at least partly formed unitarily with the main body at an end of the film-receiving chamber.

13. A camera according to claim 4 wherein the outer member is provided with a collar portion surrounding said aperture therein.

14. A camera according to claim 1 wherein said camera is a single-use camera.

15. A camera according to claim 1 wherein the shutter is slidably mounted.

16. A camera according to claim 1 wherein the shutter is pivotably mounted so as to pivot about an axis perpendicular to an axis of the film winding tool aperture.

17. A camera according to claim 1 wherein said shutter comprises two separate elements which together co-operate to close said aperture.

18. A method of loading film into a camera which comprises a main body defining a chamber for receiving a film-containing cassette, and a film-receiving chamber arranged on the opposite side of an exposure opening for receiving unexposed film, and defining at one end of the film-receiving chamber an aperture having a movably mounted shutter movable between an open position where said aperture is unobscured and a closed position in which said aperture is closed, and having resilient means to urge the shutter into the closed position, the method comprising the steps of:

a) moving said shutter against the action of said resilient means to an open position, and inserting an end portion of an elongate film winding tool through said aperture and into said film-receiving chamber;

b) withdrawing a free end of the film from the film cassette;

c) with a rear cover of the camera removed, attaching the free end of the film tool;

d) securing said rear cover of the camera to the camera main body;

e) rotating said winding tool to unwind the film from the cassette into the film-receiving chamber; and f) withdrawing the film winding tool from the film-receiving chamber and from said aperture, and allowing the shutter to close said aperture.

19. A method of loading film into a camera according to claim 18 wherein at step a) the shutter is manually opened by engaging a portion thereof and moving the shutter into the open position prior to insertion of the winding tool.

20. A method of loading film into a camera according to claim 18 wherein as said film winding tool is inserted into the aperture it abuts the movably mounted shutter to open the same.

21. A method of loading film into a camera according to claim 18 wherein after step f) the aperture is closed by a separate plug part fitted from outside the camera.

22. A method of loading film into a camera according to claim 18 wherein said film winding tool comprises an elongate rod having an end portion for receiving the leading end of the film connected to a rotatably-mounted body, the rod extending through a fixed sleeve having an end portion which at step b) abuts the camera adjacent said aperture of the film-receiving chamber.

23. A method of loading film into a camera according to claim 22 wherein said elongate rod is withdrawn from the camera prior to the camera being separated from the fixed sleeve.

24. A method of loading film into a camera according to claim 23 wherein the film winding tool is slidably supported on a base part, the tool being slidably moved towards the camera to insert the tool end into the camera at step b).

25. A method of loading film into a camera which comprises a main body defining a chamber for receiving a film-containing cassette, and a film-receiving chamber arranged on the opposite side of an exposure opening for receiving unexposed film, and defining at one end of the film-receiving chamber an aperture having a movably mounted shutter to close said aperture, the method comprising the steps of:

a) with said shutter in an open position, inserting an end portion of an elongate film winding tool through said aperture and into said film-receiving chamber;

b) withdrawing a free end of the film from the film cassette;

c) with a rear cover of the camera removed, attaching the free end of the film to the film tool;

d) rotating said winding tool to unwind the film from the cassette into the film-receiving chamber;

e) withdrawing the film winding tool from the film-receiving chamber and moving the shutter into a closed position where the aperture is obscured; and f) securing said rear cover of the camera to the camera main body.

26. A camera comprising a main body defining a chamber for receiving, in use, a film-containing cassette, and a film-receiving chamber for receiving, in use, a roll of film unwound from said cassette, the film extending between said chambers over an exposure window, a separate access member which at least partly closes one end of the film-receiving chamber and which is releasably fitted in the main body, an aperture defined in said access member for insertion of a film-winding tool, a movably mounted shutter movable between an open position where said aperture is unobscured, and a closed position where said aperture is closed, and resilient means to urge said shutter into the closed position.

27. A method of loading film into a camera which comprises a main body defining a chamber for receiving a film-containing cassette, and a film-receiving chamber arranged on the opposite side of an exposure opening for receiving unexposed film, and defining at one end of the film-receiving chamber an aperture having a movably mounted shutter movable between an open position where said aperture is unobscured and a closed position in which said aperture is closed, and having resilient means to urge the shutter into the closed position, the method comprising the steps of:

a) moving said shutter against the action of said resilient means to an open position, and inserting a plug into the aperture from inside the film-receiving chamber, the plug having a plug portion received within the aperture of sufficient axial dimension to hold said shutter in an open position;

b) inserting an end portion of an elongate film-winding tool through the aperture whereby it abuts the plug which is pushed out of the aperture and into the film-receiving chamber, the tool extending into the film-receiving chamber;

c) withdrawing a free end of the film from the film cassette;

d) with a rear cover of the camera removed, attaching the free end of the film to the film tool;

e) securing said rear cover of the camera to the camera main body;

f) rotating said winding tool to unwind the film from the cassette into the film-receiving chamber;

g) withdrawing the film winding tool from the film-receiving chamber and from said aperture, and allowing the shutter to close said aperture.

* * * * *